United States Patent [19]

Bauer

[11] Patent Number: 5,677,836
[45] Date of Patent: Oct. 14, 1997

[54] METHOD FOR PRODUCING A CELLULARLY STRUCTURED ENVIRONMENT MAP OF A SELF-PROPELLED, MOBILE UNIT THAT ORIENTS ITSELF IN THE ENVIRONMENT AT LEAST WITH THE ASSISTANCE OF SENSORS BASED ON WAVE REFECTION

[75] Inventor: Rudolf Bauer, Neubiberg, Germany

[73] Assignee: Siemens Aktiengesellschaft, Munich, Germany

[21] Appl. No.: 393,820

[22] Filed: Feb. 24, 1995

[30] Foreign Application Priority Data

Mar. 11, 1994 [DE] Germany .................. 44 08 328.9

[51] Int. Cl.⁶ ................................................ G05D 1/00
[52] U.S. Cl. ............................ 364/424.027; 364/424.031
[58] Field of Search ........................... 364/449, 424.02,
364/424.027, 424.029, 424.031, 449.1,
460, 461; 180/167, 168, 169

[56] References Cited

U.S. PATENT DOCUMENTS

| | | | |
|---|---|---|---|
| 4,718,023 | 1/1988 | Arora | 364/513 |
| 4,751,658 | 6/1988 | Kadonoff et al. | 364/513 |
| 4,821,206 | 4/1989 | Arora | 364/513 |
| 5,006,988 | 4/1991 | Borenstein et al. | 364/424.02 |
| 5,086,411 | 2/1992 | Dalglish | 365/106 |
| 5,111,402 | 5/1992 | Everett, Jr. et al. | 364/424.02 |
| 5,204,814 | 4/1993 | Noonan et al. | 364/424.02 |
| 5,307,419 | 4/1994 | Tsujino et al. | 382/1 |
| 5,363,305 | 11/1994 | Cox et al. | 364/443 |
| 5,402,051 | 3/1995 | Fujiwara et al. | 318/587 |
| 5,502,638 | 3/1996 | Takenaka | 364/424.02 |

FOREIGN PATENT DOCUMENTS

0358628A2  3/1990  European Pat. Off. .
3315613A1  11/1983  Germany .

OTHER PUBLICATIONS

"Histogramic In–Motion Mapping for Mobile Robot Obstacle Avoidance", IEEE Transactions on Robotics and Automation, vol. 7, No. 4, Aug. 1991 by Johann Borenstean and Yoram Koren, pp. 535–539.

*Primary Examiner*—Kevin J. Teska
*Assistant Examiner*—Stephen J. Walder, Jr.
*Attorney, Agent, or Firm*—Hill, Steadman & Simpson

[57] ABSTRACT

The method produces an improved cellularly structured environment map of a self-propelled mobile unit which orients itself using sensors based on wave reflection. In detail, the following measures are implemented. First, an error of discrete representation in the positional determination of the self-propelled mobile unit is avoided in that the position of the self-propelled mobile unit within an originating cell of the coordinate system of the environment map is also used for identifying the location of obstacles. Further, a smaller cell size is employed in the proximity of the self-propelled mobile unit in order to facilitate maneuvering between obstacles located close to one another. Further, two separate grid maps are maintained, one containing the unit with a rotational orientation and the other being rotated by a rotational angle relative to the global environment map for a fast occupation of a plurality of cells with values. Examples of such self-propelled mobile units are household robots, self-propelled vacuums and industrial transport vehicles.

8 Claims, 3 Drawing Sheets

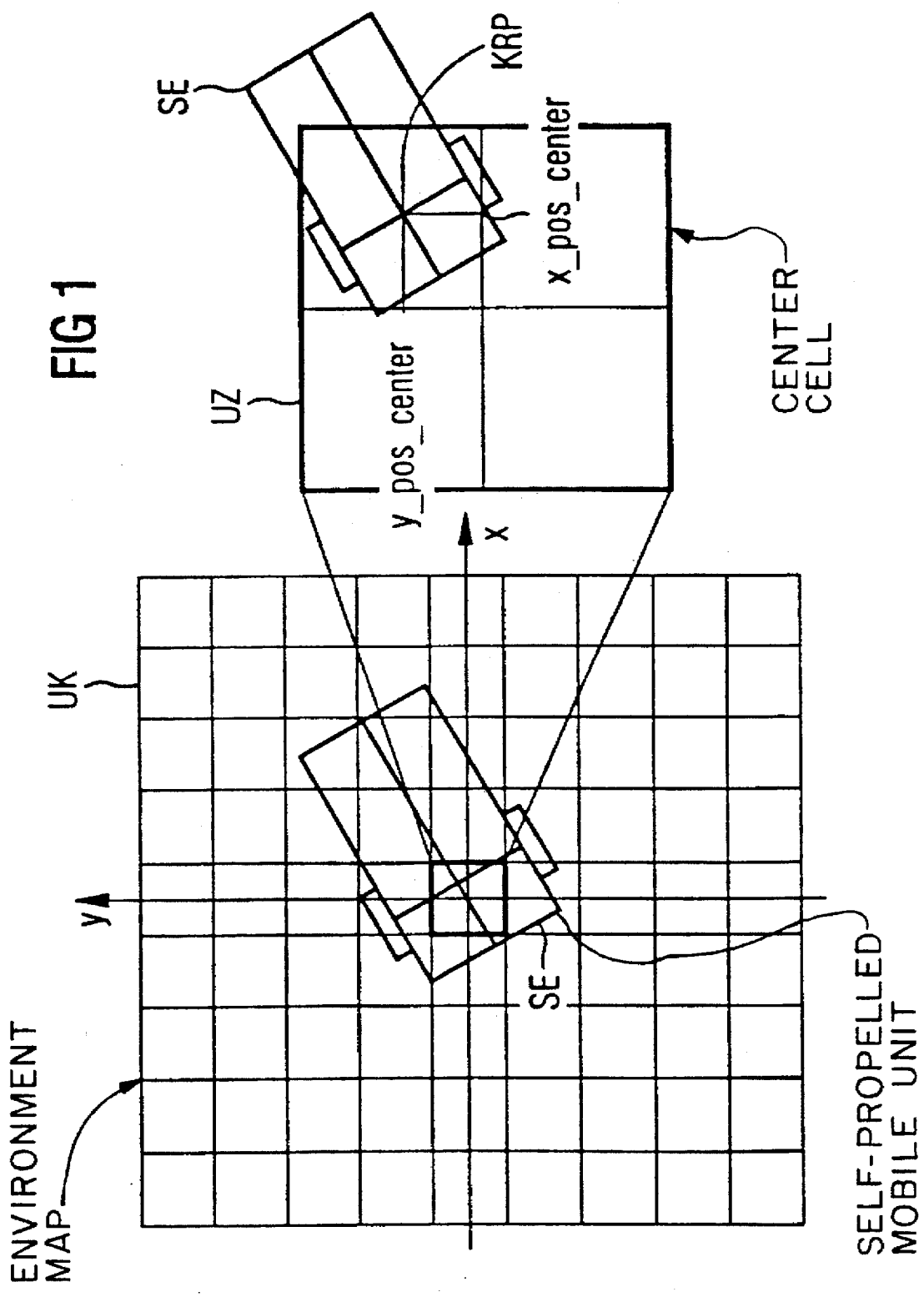

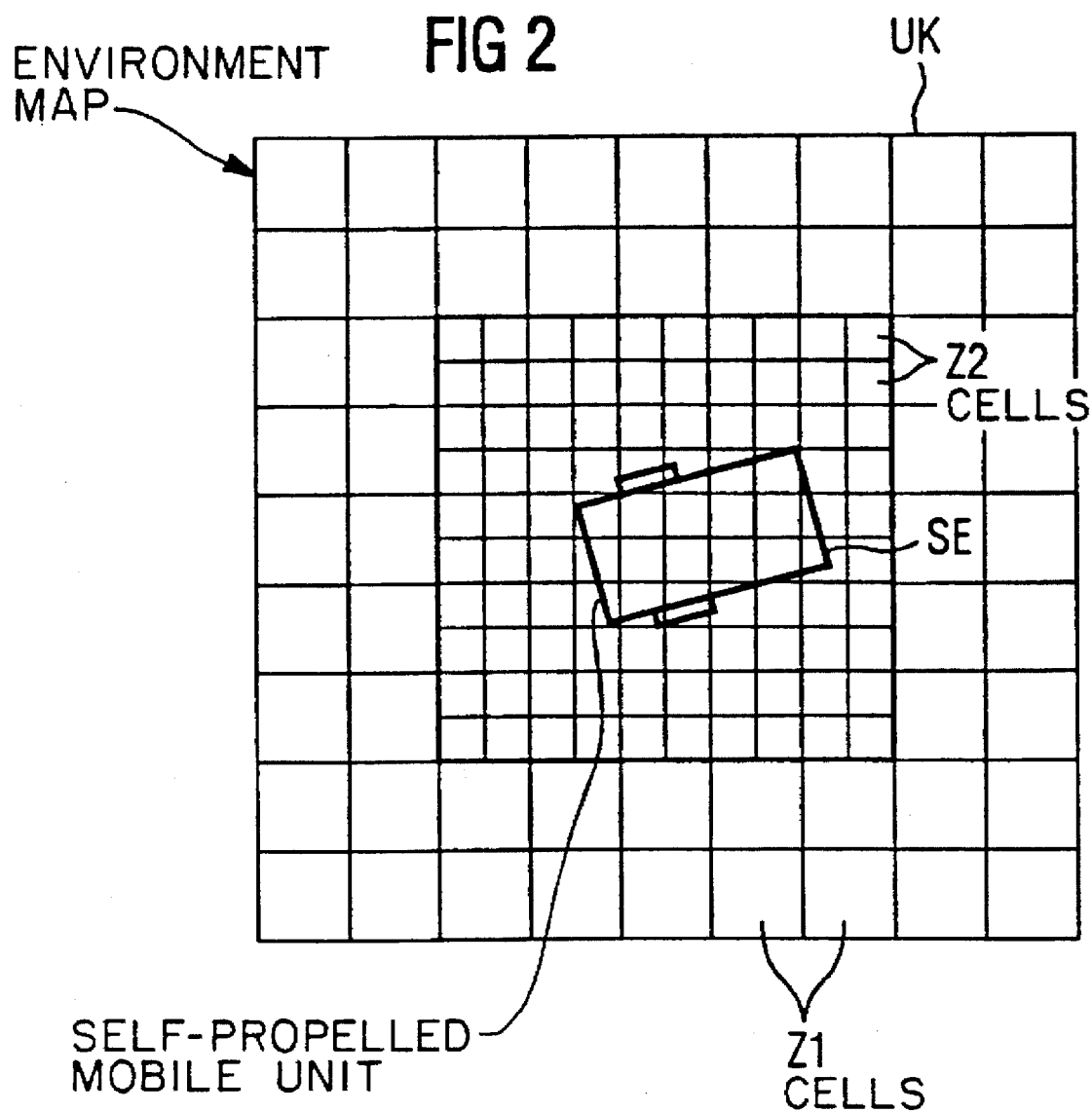

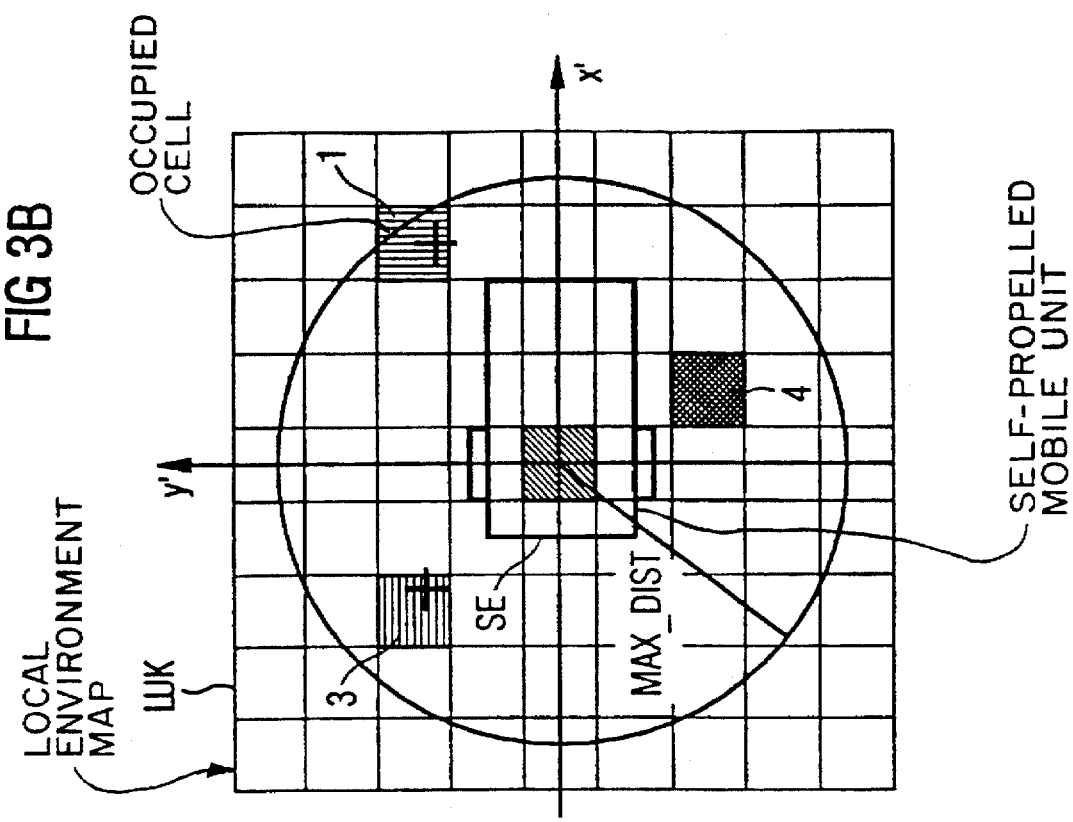
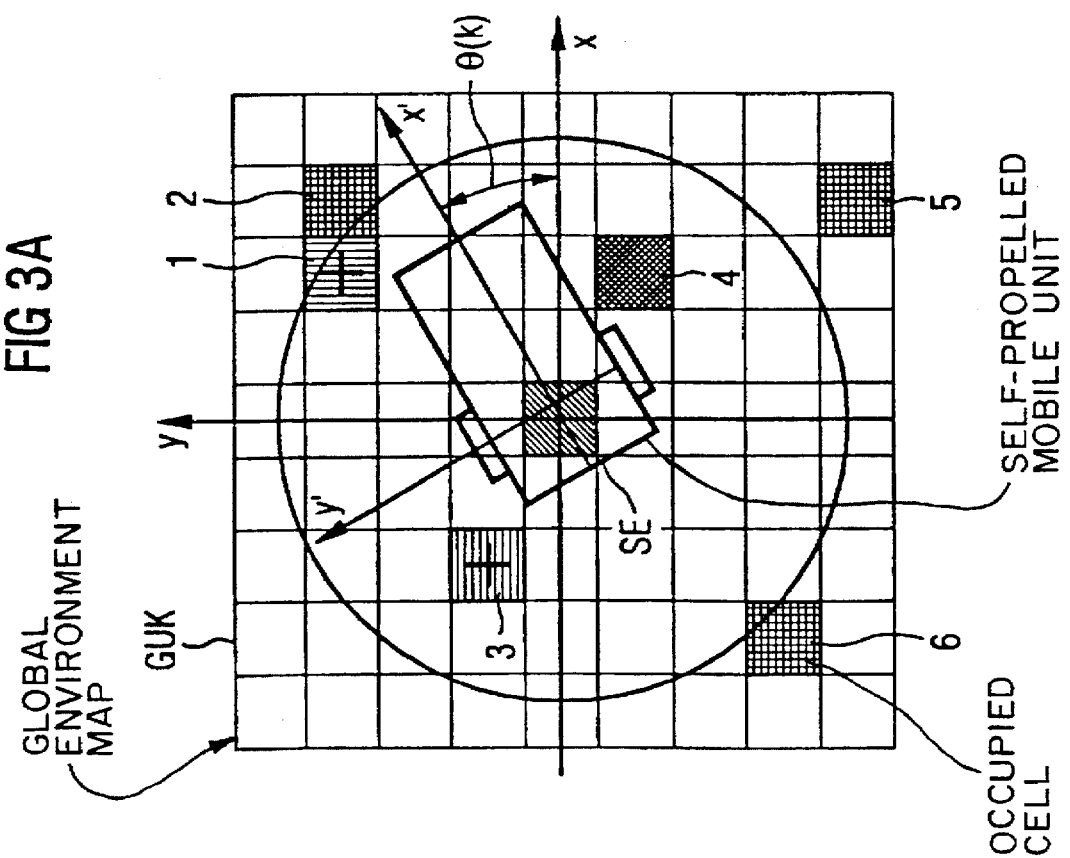

METHOD FOR PRODUCING A CELLULARLY STRUCTURED ENVIRONMENT MAP OF A SELF-PROPELLED, MOBILE UNIT THAT ORIENTS ITSELF IN THE ENVIRONMENT AT LEAST WITH THE ASSISTANCE OF SENSORS BASED ON WAVE REFECTION

BACKGROUND OF THE INVENTION

Presently, there are a number of different ways of using autonomously operating, mobile units. In this context, tele-reconnaissance probes, mobile units that operate in danger zones, self-propelled industrial vacuums, transport vehicles in manufacturing and, last but not least, self-propelled robots are just some of the possibilities. However, in order to be able to perform a meaningful job in an environment that is unknown a priori, an autonomous, mobile robot must both construct step-by-step a reliable map of its work environment and be able to orientate itself with reference to this map at any given point in time. As a consequence of the extremely complex and unstructured environments in which such self-propelled units may possibly maneuver, their areas of employment are often limited to office and household environments. Since an a priori map is generally not available, such a self-propelled unit must be equipped with sensors which allow the unit to flexibly interact with its environment. For example, some of such sensors are laser range scanners, video cameras and ultrasound sensors.

A specific problem with these mobile units is that the creation of the environment map and the orientation of the mobile unit are dependent on one another. Various errors thereby enter in. First, such a mobile unit measures the distance it has traversed from an initial position; second, it measures the distance from existing obstacles with distance sensors and enters these in the environment map as landmarks. Since errors accumulate and add up over longer distances, there is a defined limit to the meaningful maneuverability of the mobile unit.

In one method for orienting self-propelled, mobile units in unknown environments the unit constructs a two-dimensional grid of its environment and provides individual cells of this grid with occupation values. The occupation values assigned per grid cell represent the occurrence of obstacles in the environment.

One method for orienting self-propelled units in grid maps is described in the publication "Histogrammic in Motion Mapping for Mobile Robot Obstacle Avoidance", IEEE Transactions on Robotics Automation, Vol. 7, No. 4, August 1991, by J. Borenstein and Yoram Koren. This publication describes how an environment map of a self-propelled mobile unit can be produced with ultrasound sensors.

SUMMARY OF THE INVENTION

It is an object of the present invention to provide a method with which the production of a cellularly structured environment map is improved in that the orientation of a self-propelled mobile unit within the environment map is improved.

In general terms the present invention is a method for producing a cellularly structured environment map with a self-propelled mobile unit that orients itself in the environment at least using sensors based on wave reflection. The method has the following steps. The distance of the sensor from an environmental article is identified by a sensor. The exact position of a coordinate reference point within an originating cell of the environment map is used as a current position of the self-propelled mobile unit at a point in time of a measurement. At least that cell that is identified, taking the current position, the distance and an arranged position of the sensor relative to the coordinate reference point into consideration, has a degree of occupancy allocated to it for determining the location of the environment article in the environment map.

In an advantageous development of the present invention cells of different sizes are used for producing the environment map, a smaller cell size being used in the proximity of the self-propelled mobile unit and a larger cell being used at more of a distance from the self-propelled mobile unit.

In one embodiment of the present invention a local environment map and a global environment map are produced by the self-propelled mobile unit. All cells in the local environment map have a fixed topical relationship to the self-propelled mobile unit. In contrast thereto the cells in the global map have a specific, variable rotation compared to the self-propelled mobile unit produced by the motion of the self-propelled mobile unit and defined by a rotational angle. The cells of the global grid merely experience a translation during a motion of the self-propelled mobile unit and a different rotational angle is established dependent on the motion. The local environment map is derived from the global environment map by applying trigonometric functions using the rotational angle, being derived therefrom for an evaluation that affects a plurality of cells of the environment map. Only the global environment map is utilized for a route planning of the self-propelled mobile unit.

Advantageously, the method of the present invention provides that the orientation of the self-propelled mobile unit within the originating cell of an environment map be also taken into consideration in the determination of the distance from articles or obstacles in the environment. Dependent on the selected cell size, this leads to an improved presentation of the environment map because it is a more precise presentation of the environment map since the discrete representation is limited to the cells of the environment map to be occupied and the current position of the self-propelled mobile unit need not be discretely provided.

In order to assure an improved maneuverability of the self-propelled mobile unit, the method of the present invention provides that smaller grid cells be employed in the proximity of the self-propelled mobile unit since the mobile unit can also maneuver between obstacles located close to one another as a consequence of the finer resolution. It is thereby also advantageous that cells that are located at a greater distance have a larger dimension and thus use less calculating outlay of a control computer in establishing the value occupation.

In order to avoid an accumulation of orientation error within the cellularly structured grid that results from the discrete representation of the motion, it is advantageously provided in the method of the invention to employ a local and a global environment map. Only the global environment map is employed for control and for a tentative planning of the self-propelled mobile unit. The employment of the local environment map, however, has the advantage that all cells comprise a fixed topical relationship to the self-propelled mobile unit and that value occupations that simultaneously affect a plurality of cells can thus be implemented with low calculating outlay.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a self-propelled mobile unit in a cellularly structured environment map;

FIG. 2 shows an example of two different cell sizes in an environment map; and

FIGS. 3A and 3B show a local environment map and a global environment map, respectively.

DESCRIPTION OF THE PREFERRED EMBODIMENT

FIG. 1 shows a self-propelled mobile unit SE in an environment map UK. This environment map is cellularly structured and has a system of coordinates x, y. The originating cell (center cell) of the environment map UZ is thereby shown enlarged; the scale of the self-propelled mobile unit, however, has not been retained. In order to improve orientation of the self-propelled mobile unit SE in the environment map UK, the current position of the self-propelled mobile unit SE in a measuring event is retained in the originating cell UZ as y_pos_center and x_pos_center. These two coordinate values indicate the location of the coordinate reference point KRP. The occupation of a cell in the environment map with an article of the environment which may possibly represent an obstacle can be precisely undertaken as follows. First, the dimensions of the self-propelled mobile unit are known; second, the location of the sensor on the self-propelled mobile unit is known. When a sensor calculates the distance to an obstacle, the location of the obstacle in the environment map can be more precisely defined due to the geometry of the self-propelled mobile unit and the coordinate particulars of the coordinate reference point KRP. That is, a higher precision is achieved in the determination of a cell to be occupied with a degree of occupation and, thus, the imaging quality of the map is improved.

FIG. 2 shows a self-propelled mobile unit SE in an environment map UK. In this example of the environment map, two different cell sizes Z1 and Z2 have been selected. In order to also improve the maneuverability of the self-propelled mobile unit SE between obstacles located close to one another, a smaller cell size is utilized in the proximity of the self-propelled mobile unit SE. A higher resolution in the perception of the environment is acquired in this way and a more exact motion sequence control of the self-propelled mobile unit can ensue. As a result of employing larger cells at a greater distance from the self-propelled mobile unit SE, a lower evaluation outlay is achieved. This means that less calculating outlay is required for the measuring event and the occupation of these cells with occupation degrees that is connected thereto.

FIG. 3A shows an example of the employment of a local environment map LUK and of a global environment map GUK. A self-propelled mobile unit is shown in a global environment map GUK that is formed by the system of coordinates x y. Various occupied cells 1–6 of the environment map are contained therein, these being occupied with different degrees of occupation, shown with different blackening. The self-propelled mobile unit SE assumes a rotatory orientation in the global environment map GUK, this being identified by a rotational angle $\Theta$ (k).

While the self-propelled mobile unit SE is moving within the environment, only translations of the individual grid cells with reference to the self-propelled mobile unit are implemented. The nature and the size of the translation (x or y direction) of one or more cells is dependent on the speed and on the orientation of the self-propelled mobile unit SE in the global environment map GUK.

In order to be able to implement simple corrections of data values of various cells of the environment map, a local environment map LUK (see FIG. 3B) is derived from the global environment map. The self-propelled mobile unit SE has no rotatory orientation in this local environment map LUK. However, it should be observed that the individual cells 1, 3 and 4 are entered in this local environment map LUK, which is rotated by the amount of the angle $\Theta$. The local environment map LUK is formed by a coordinate system x'-y'. In this case, for example, all those cells that are encountered beyond a specific distance MAX_DIST are to be eliminated from the map. To this end, for example, the orientation of all cells with reference to the local environment map LUK can be permanently stored in a process control computer of the self-propelled mobile unit SE. Only the memory contents for the occupied cells need be compared to the stored coordinate particulars and a determination must be made as to whether their distance from the self-propelled mobile unit SE exceeds MAX_DIST. It can be seen that the occupied cells 2, 5 and 6 are eliminated on the basis of this evaluation process.

It is thereby important to note that the self-propelled mobile unit SE orients itself only within the global environment map GUK and that the motion planning of this self-propelled mobile unit SE occurs only with reference to the stored values from the global environment map. Thus, an error cannot accumulate, when the error occurs in the conversion of the global environment map into the local environment map and arises due to the discrete representation of the values in the form of cell positions.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for producing a cellularly structured environment map with a self-propelled mobile unit that orients itself in an environment at least using sensors based on wave reflection, the method comprising the steps of:

providing dimensions of the mobile unit, the mobile unit having a sensor, and providing a location of the sensor on the mobile unit, a coordinate reference point being determined from a current position of the mobile unit in an originating cell utilizing the dimensions of the mobile unit and the location of the sensor on the mobile unit;

determining a distance, using the sensor on the self-propelled mobile unit, from an environmental article to the sensor during a measurement wherein the self-propelled mobile unit is in an originating cell of the environment map;

using a current position of the self-propelled mobile unit at a point in time of the measurement as an exact position of the coordinate reference point within the originating cell of the environment map; and identifying at least one cell, taking the current position, the distance and an arranged position of the sensor relative to the coordinate reference point into consideration, occupied by the environmental article and allocating to said at least one cell a degree of occupancy for determining a location of the environmental article in the environment map.

2. The method according to claim 1, wherein the method further comprises using cells of different sizes for producing the environment map.

3. The method according to claim 2, wherein a smaller cell size is used in a proximity of the self-propelled mobile unit and a larger cell size is used away from the proximity of the self-propelled mobile unit.

4. The method according to claim 1, wherein the method further comprises:

producing a local environment map and a global environment map with the self-propelled mobile unit, providing cells in the local environment map that all have a fixed topical relationship to the self-propelled mobile unit, and providing cells in the global map that have a specific, variable rotation relative to the self-propelled mobile unit resulting from motion of the self-propelled mobile unit and defined by a rotational angle;

only translating the cells of the global grid during a motion of the self-propelled mobile unit and establishing a different rotational angle dependent on the motion;

deriving the local environment map from the global environment map by applying trigonometric functions using the rotational angle, the local environment map being derived therefrom for an evaluation that affects a plurality of cells of the environment map; and using the global environment map for a route planning of the self-propelled mobile unit.

5. A method for producing a cellularly structured environment map with a self-propelled mobile unit that orients itself in an environment at least using sensors, the method comprising the steps of:

providing a cellularly structured environment map having cells, a smaller cell size used in a proximity of the self-propelled mobile unit and a larger cell size being used away from the proximity of the self-propelled mobile unit;

providing dimensions of the mobile unit, the mobile unit having a sensor, and providing a location of the sensor on the mobile unit, a coordinate reference point being determined from a current position of the mobile unit in an originating cell utilizing the dimensions of the mobile unit and the location of the sensor on the mobile unit;

determining a distance, using the sensor on the self-propelled mobile unit, from an environmental article to the sensor during a measurement wherein the self-propelled mobile unit is in an originating cell of the environment map;

using a current position of the self-propelled mobile unit at a point in time of the measurement as an exact position of the coordinate reference point within the originating cell of the environment map; and identifying at least one cell, taking the current position, the distance and an arranged position of the sensor relative to the coordinate reference point into consideration, occupied by the environmental article and allocating to said at least one cell a degree of occupancy for determining a location of the environmental article in the environment map.

6. A method for producing a cellularly structured environment map with a self-propelled mobile unit that orients itself in an environment at least using sensors, the method comprising the steps of:

producing a local environment map and a global environment map with the self-propelled mobile unit, providing cells in the local environment map that all have a fixed topical relationship to the self-propelled mobile unit, and providing cells in the global map that have a specific, variable rotation relative to the self-propelled mobile unit resulting from motion of the self-propelled mobile unit and defined by a rotational angle;

only translating the cells of the global grid during a motion of the self-propelled mobile unit and establishing a different rotational angle dependent on the motion;

deriving the local environment map from the global environment map by applying trigonometric functions using the rotational angle, the local environment map being derived therefrom for an evaluation that affects a plurality of cells of the environment map;

providing dimensions of the mobile unit, the mobile unit having a sensor, and providing a location of the sensor on the mobile unit, a coordinate reference point being determined from a current position of the mobile unit in an originating cell utilizing the dimensions of the mobile unit and the location of the sensor on the mobile unit;

determining a distance, using the sensor on the self-propelled mobile unit, from an environmental article to the sensor during a measurement wherein the self-propelled mobile unit is in an originating cell of the global environment map;

using a current position of the self-propelled mobile unit at a point in time of the measurement as an exact position of the coordinate reference point within the originating cell of the global environment map; and identifying at least one cell, taking the current position, the distance and an arranged position of the sensor relative to the coordinate reference point into consideration, occupied by the environmental article and allocating to said at least one cell a degree of occupancy for determining a location of the environmental article in each of the global environment map and the local environment map; and using the global environment map for a route planning of the self-propelled mobile unit.

7. A method for producing a cellularly structured environment map with a self-propelled mobile unit that orients itself in an environment at least using sensors based on wave reflection, the method comprising the steps of:

providing dimensions of the mobile unit, the mobile unit having a sensor, and providing a location of the sensor on the mobile unit, a coordinate reference point being determined from a current position of the mobile unit in an originating cell utilizing the dimensions of the mobile unit and the location of the sensor on the mobile unit;

determining a distance, using the sensor on the self-propelled mobile unit, from an environmental article to the sensor during a measurement wherein the self-propelled mobile unit is in an originating cell of the environment map;

using a current position of the self-propelled mobile unit at a point in time of the measurement as an exact position of the coordinate reference point within the originating cell of the environment map; and identifying at least one cell, taking the current position, the distance and an arranged position of the sensor relative to the coordinate reference point into consideration, occupied by the environmental article and allocating to said at least one cell a degree of occupancy for determining a location of the environmental article in the environment map, a smaller cell size being used in a proximity of the self-propelled mobile unit and a larger cell size being used away from the proximity of the self-propelled mobile unit.

8. A method for producing a cellularly structured environment map with a self-propelled mobile unit that orients itself in an environment at least using sensors based on wave reflection, the method comprising the steps of:

determining a distance, using a sensor on the self-propelled mobile unit, from an environmental article to the sensor during a measurement wherein the self-propelled mobile unit is in an originating cell of the environment map;

using a current position of the self-propelled mobile unit at a point in time of the measurement as an exact position of a coordinate reference point within the originating cell of the environment map;

identifying at least one cell, taking the current position, the distance and an arranged position of the sensor relative to the coordinate reference point into consideration, occupied by the environmental article and allocating to said at least one cell a degree of occupancy for determining a location of the environmental article in the environment map;

using cells of different sizes for producing the environment map, a smaller cell size being used in a proximity of the self-propelled mobile unit and a larger cell size being used away from the proximity of the self-propelled mobile unit.

\* \* \* \* \*